(12) United States Patent
Tanimura

(10) Patent No.: US 7,466,433 B2
(45) Date of Patent: Dec. 16, 2008

(54) OBJECT IMAGE PRINT SERVICE SYSTEM

(75) Inventor: Masayoshi Tanimura, Nakakoma-gun (JP)

(73) Assignees: Nintendo Co. Ltd., Kyoto (JP); Hal Laboratory Inc., Tokyo (JP)

( * ) Notice: Subject to any disclaimer, the term of this patent is extended or adjusted under 35 U.S.C. 154(b) by 398 days.

(21) Appl. No.: 11/038,040

(22) Filed: Jan. 21, 2005

(65) Prior Publication Data
US 2005/0122541 A1 Jun. 9, 2005

Related U.S. Application Data

(62) Division of application No. 09/495,519, filed on Feb. 1, 2000, now abandoned.

(30) Foreign Application Priority Data

Feb. 19, 1999 (JP) ............... 1999-84502
Mar. 19, 1999 (JP) ............... 1999-76462

(51) Int. Cl.
*G06F 15/00* (2006.01)
*G09G 5/00* (2006.01)

(52) U.S. Cl. ...................... 358/1.1; 345/619

(58) Field of Classification Search ........... 358/500, 358/518, 1.15, 1.13, 1.1; 345/159, 313, 419, 345/591, 619, 700, 821, 865; 463/7, 9, 40, 463/43, 42, 175, 427; 235/380, 382; 710/20–21, 710/13, 300

See application file for complete search history.

(56) References Cited

U.S. PATENT DOCUMENTS

| | | | | |
|---|---|---|---|---|
| 5,218,350 A | * | 6/1993 | Bollman | 345/619 |
| 5,521,722 A | * | 5/1996 | Colvill et al. | 358/500 |
| 5,779,548 A | | 7/1998 | Asai et al. | 463/31 |
| 6,138,173 A | * | 10/2000 | Hisano | 710/2 |
| 6,231,443 B1 | | 5/2001 | Asai et al. | 463/32 |
| 6,419,581 B2 | | 7/2002 | Asai et al. | 463/32 |

FOREIGN PATENT DOCUMENTS

JP 06-068236 3/1994

(Continued)

OTHER PUBLICATIONS

Japanese Official Action issued in connection with corresponding Japanese Patent Application No. 11-076462, dated Jul. 14, 2008.

*Primary Examiner*—Saeid Ebrahimi Dehkordy
(74) *Attorney, Agent, or Firm*—Nixon & Vanderhye P.C.

(57) ABSTRACT

In a three-dimensional object image print service system capable of printing out a desired three-dimensional object image, a three-dimensional image display apparatus includes a three-dimensional object image generator for generating a three-dimensional object image, based on instructions from an input device operated by a user and a three-dimensional object image generation program previously provided. The three-dimensional image display device further includes a selector for selecting arbitrary part of the three-dimensional object image generated based on instructions from the user, and a transition information generator for generating transition information of a three-dimensional object image representing the selected arbitrary part of the three-dimensional object image. The three-dimensional object image arbitrarily selected by the user can be reproduced based on the transition information and the three-dimensional object image generation program.

14 Claims, 8 Drawing Sheets

FOREIGN PATENT DOCUMENTS

| | | |
|---|---|---|
| JP | A-H06-68236 | 3/1994 |
| JP | 09-106408 | 4/1997 |
| JP | A-H09-106408 | 4/1997 |
| JP | 10-216357 | 8/1998 |
| JP | A-H10-216357 | 8/1998 |

* cited by examiner

F I G. 2
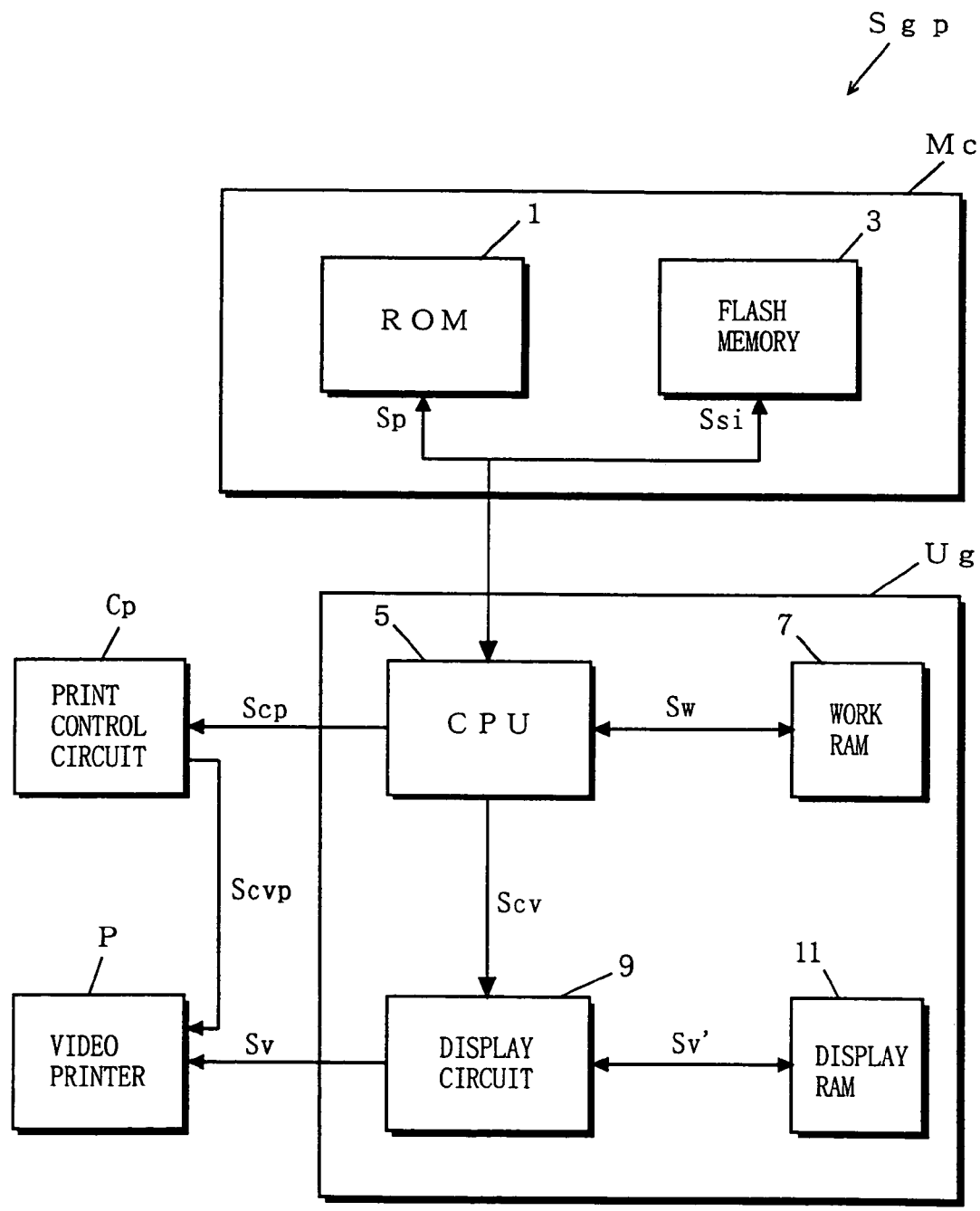

OBJECT IMAGE PRINT SERVICE SYSTEM

CROSS-REFERENCES TO RELATED APPLICATIONS

This application is a divisional of application Ser. No. 09/495,519, filed Feb. 1, 2000, now abandoned, the entire content of which is hereby incorporated by reference in this application.

BACKGROUND OF THE INVENTION

1. Field of the Invention

The present invention relates to television game machines by which a user can select an image of a virtual world constructed in a television game and print out the selected image. More specifically, the present invention relates to a television game image print service system enabling a user to arbitrarily select and print out virtual world images that are variable according to user's play in a game.

2. Description of the Background Art

Conventionally, in television games, states of the game during play are only kept in the user's mind after game play. To share the fun of the play with someone else after the game is over, the user has to describe it orally. Thus, game machines have been provided that can store an image representing the state during play in memory, and be restarted to display the stored image on a screen as desired in order to show it to someone else at a later time required.

Such game machines, however, requires the game machine console for reproducing and displaying the image stored in the memory. Therefore, it is substantially impossible to show the reproduced image to someone at an arbitrary place where no console exists. In other words, to reproduce the game image and show it to someone, the user first has to bring the memory with the game image stored therein to a place where a game machine has been installed or is available, or bring both the memory and the game machine console. Thus, in conventional game machines, it is impossible to carry a desired game image at will and show it to someone at an arbitrary place where no console exists.

SUMMARY OF THE INVENTION

The present invention is designed to solve the problem described above. An object of the present invention is to provide a television game machine and a television game image print service system enabling a user to select an image of a virtual world constructed in a television game and print out the selected image, so that the user can carry a desired game image at will and show it to someone at an arbitrary place without the need for a game console.

The present invention has the following features to achieve the object above.

A first aspect of the present invention is directed to an apparatus for displaying an object image, comprising:
an object image generator for generating the object image by operating an object image generation program previously provided, according to instructions from a user;
a selector for selecting an arbitrary part of the generated object image, according to instructions from the user;
a transition information generator for generating transition information when the object image is selected; and
a transition information storage device for storing the transition information, wherein
the object image arbitrarily selected by the user is recoverable at a future time according to the transition information stored in the transition information storage device and the object image generation program.

As described above, in the first aspect, the arbitrarily selected part of the object image is stored not as the image data indicative of the image itself but as its transition information which is far smaller in data amount than the image data itself. The selected object image is then recovered based on the stored transition information with the object image generation program. Therefore, since the amount of data to be stored and reproduced is small, it is possible to store and recover more images at higher speed.

In a preferred embodiment described later, the object image generation program is stored in ROM, and
the transition information storage device may be constructed of rewritable non-volatile memory. In this case, since the transition information storage device is constructed of rewritable non-volatile memory, the transition information stored in the transition information storage device is updated.

The ROM and the rewritable non-volatile memory are accommodated in a device that is removable from a body of the object image display apparatus. In this case, since the object image generation program and the transition information are stored in one body, high portability can be achieved.

Further, the ROM and the rewritable non-volatile memory are separately removable from the body of the object image display apparatus. In this case, the transition information storage device is constructed of the rewritable non-volatile memory, and the object image generation program and the transition information are accommodated separately, enabling the transition information storage device to be used in combination with another object image generation program.

Moreover, the apparatus further comprises a recovery device with a recovery program for recovering the object image arbitrarily selected by the user by operating the object image generation program using the transition information stored in the transition information storage device as an operational parameter.

Still further, the object image generator may be constructed so as to generate the object image according to progress of a game which varies in response to instructions from the user. In this case, the object image is reproduced according to the progress of the game even when the user does not specifically select any image.

The object image may be a two-dimensional image or a three-dimensional image.

Still further, the transition information includes coordinates and direction of an object and coordinates and direction of a viewpoint. In this case, therefore, it is possible to record and reproduce an arbitrary part of the object from an arbitrary viewpoint.

Still further, the transition information is game progress information in a game. In this case, therefore, it is possible to record and reproduce the image according to the progress of the game.

A second aspect of the present invention is directed to a system for printing an object image, comprising:
an object image processing apparatus for processing the object image; and
a printer for printing the object image processed by the object image processing apparatus,
the object image processing apparatus
generating the object image by operating an object image generation program previously provided, according to instructions from a user;

selecting an arbitrary part of the generated object image, according to instructions from the user;

generating transition information of an object image representing the selected arbitrary part of the object image; and recovering the object image arbitrarily selected by the user by operating the object image processing program using the transition information as an operational parameter, and the printer printing the recovered object image.

In the second aspect, for the arbitrarily-selected part of the object image, not image data is indicative of the image itself but the transition information that is far smaller in data amount than the image data is generated. Based on the generated transition information, the selected object image is recovered and printed. Therefore, it is possible to select and print more images at higher speed.

In the embodiment described below, the system further comprises:

a display device for displaying a plurality of object images recovered by operating the object image processing program using the transition information as an operational parameter, as recovered object images; and a recovered image selector for selecting an arbitrary recovered object image from the recovered object images displayed on the display device according to instructions by the user, and a printer that prints the selected recovered object image.

In this case, it is possible to recover and display the object images selected by the user, and the user can select an object image to be printed based on the display.

A third aspect of the present invention is directed to a system for printing an object image, comprising:

an object image generator for generating an object image to be displayed and recovery data for the object image to be printed;

a recovery device for recovering the object image to be printed based on the recovery data supplied from the object image generator; and a printer for printing the object image recovered by the recovery device, the object image generator generating the object image to be displayed by operating an object image generation program previously provided, according to instructions from a user, selecting an arbitrary part of the generated object image, according to instructions from the user, and generating transition information of an object image representing the selected arbitrary part of the object image as the recovery data, the recovery device, with a program identical to the object image generation program stored therein, recovering the selected object image arbitrarily selected by the user by operating the program identical to the object image generation program using the transition information as an operation parameter, and printing the recovered object image using the printer.

In the third aspect, the same effects as in the second aspect can be achieved, and the object image can be recovered with the object image generation program.

A fourth aspect of the present invention is directed to a method for printing an object image, comprising the steps of:

generating the object image by operating an object image generation program previously provided, according to instructions from a user;

selecting an arbitrary part of the generated object image, according to the instructions from the user;

generating transition information of an object image representing the selected arbitrary part of the object image;

recovering the object image arbitrarily selected by the user by operating the object image processing program with the transition information as an operational parameter; and printing the recovered object image.

As described above, in the fourth aspect, for the arbitrarily-selected part of the object image, rather than image data indicative of the image itself, the transition information is generated that is far smaller in data amount than the image data. Based on the generated transition information, the selected object image is recovered and printed. Therefore, it is possible to select and print more images at higher speed.

In the embodiment described below, the method further comprises the steps of:

displaying a plurality of object images recovered by operating the object image processing program by using the transition information as the operational parameter, as recovered object images;

selecting an arbitrary recovered object image from the recovered object images displayed on the display device, according to instructions by the user; and printing the selected recovered object image.

In this case, it is possible to recover and display the object images selected by the user, and the user can select an object image to be printed based on the display.

A fifth aspect of the present invention is directed to a recording medium with a computer program recorded thereon to control an object image generator for generating an object image, the computer program causing the object image generator to execute the steps of:

generating an object image by operating an object image generation program previously provided according to instructions from a user;

selecting an arbitrary part of the generated object image, according to instructions from the user; and generating transition information of an object image representing the selected arbitrary part of the object image, where in the object image arbitrarily selected by the user can be recovered at a future time according to the transition information stored in the transition information storage device and the object image generation program.

In the fifth aspect, an operational environment in the first aspect can be achieved by loading the computer program to a computer.

In the embodiment described below, the computer program further causes the object image generator to execute the steps of:

recovering the object image arbitrarily selected by the user by operating the object image processing program using the transition information as an operational parameter; and printing the recovered object image.

The computer program further causes the object image generator to execute the steps of:

displaying a plurality of object images recovered by operating the object image processing program as recovered object images, using the transition information as an operational parameter; and selecting an arbitrary recovered object image from the recovered object images displayed on the display device according to instructions by the user; and printing the selected recovered object image.

In this manner, it is possible to recover and display the object images selected by the user, and the user can select an object image to be printed based on the display.

A sixth aspect of the present invention is directed to an apparatus for displaying an object image, comprising:

an object image generator for generating the object image by operating an object image generation program previously provided, according to instructions from a user;

a selector for selecting an arbitrary part of the generated object image according to instructions from the user;

a transition information generator for generating transition information when the object image is selected; and a transition information storage device for storing the transition information, wherein the object image arbitrarily selected by the user is recoverable after the image generation program ends, according to the transition information stored in the transition information storage device and the object image generation program.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block showing a television game image print service system according to one embodiment of the present invention;

DESCRIPTION OF THE PREFERRED EMBODIMENTS

Figure 1:
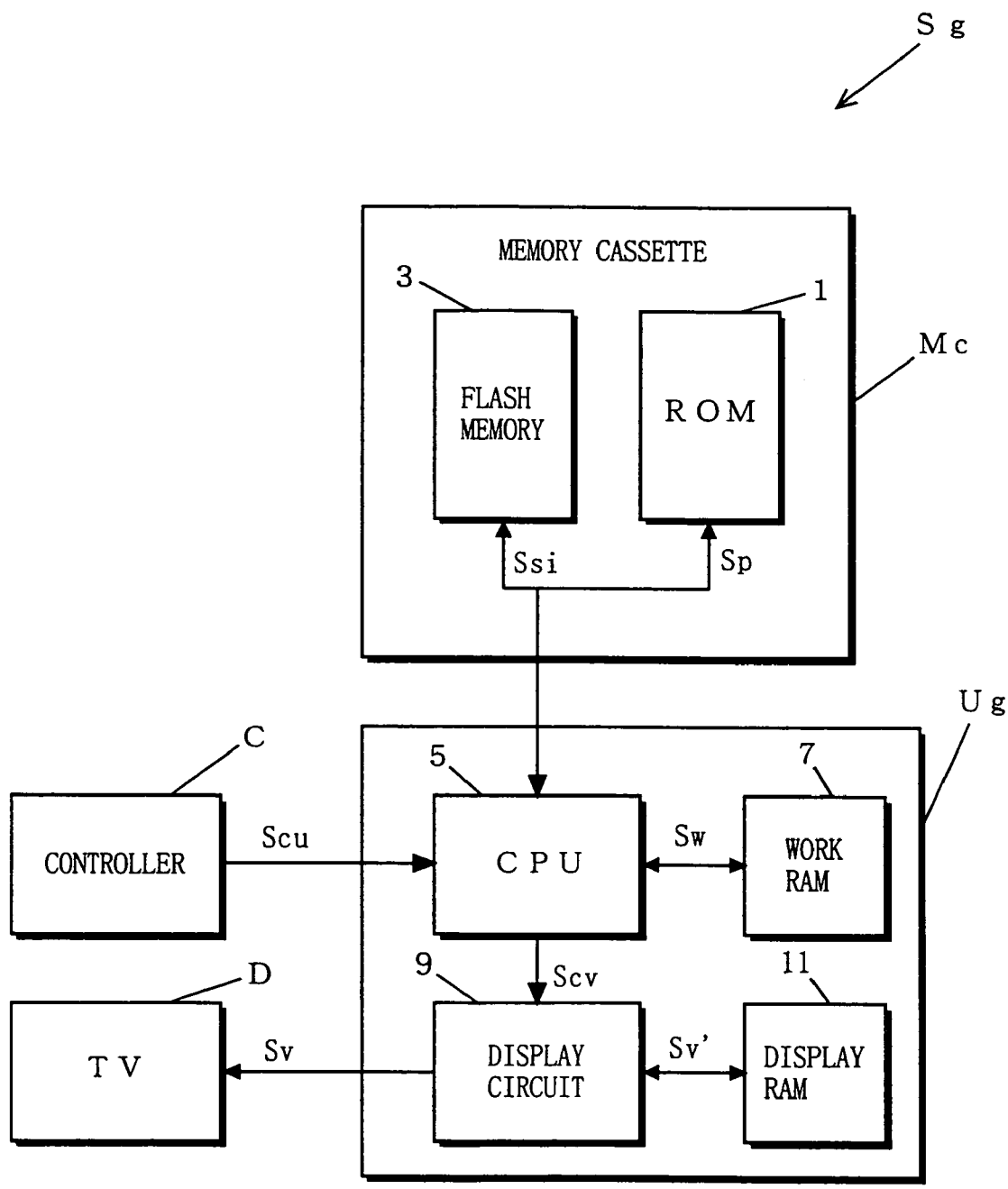
FIG. 1 is a block diagram showing a television game system according to one embodiment of the present invention.

Described below is a television game image print system incorporating a three-dimensional object image print system according to one embodiment of the present invention into a television game machine. With reference to FIG. 1, described first is an example of the construction of a television game system Sg constructing the television game image print system. As shown in FIG. 1, the television game system Sg includes a television game machine Ug, a memory cassette Mc storing data of a television game, a controller C operated by the user to convey commands of a user to the television game machine Ug and a television set D, which is a display device for displaying a game image. The controller C generates a user instruction signal Scu indicating the intention of the user according to the user's operation.

The memory cassette Mc includes ROM 1 storing an execution program for the game, and non-volatile flash memory 3 storing data indicative of the game image selected by the user (hereinafter referred to as "selected game image data").

The television game machine Ug includes a CPU 5, work RAM 7, a display circuit 9, and display RAM 11. The CPU 5 is bi-directionally connected to the ROM 1 and the flash memory 3 in the memory cassette Mc to exchange game program data Sp and selected game image data Ssi, respectively. The CPU 5 is further connected to the controller C to receive input of the user instruction signal Scu.

According to the game program data Sp fed from the ROM 1 and the user instruction signal Scu, the CPU 5 performs various calculation to make the game proceed, determines the game contents to be displayed, and generates display game image data Scv representing the determined game contents. The CPUS is connected to the work RAM 7, and exchanges working data Sw generated at calculation.

The display circuit 9 is connected to the CPU 5, and when supplied with the display game image data Scv, generates game video data Sv to be actually displayed on the television device D. The display circuit 9 is connected to the display RAM 11, and temporarily stores the generated game video audio data Sv.

As a matter of course, the television game machine Ug may include an audio processing circuit for reproducing audio data that provides sound effects according to the progress of the game. However, description of audio processing is omitted herein for the purpose of simplification.

With reference to FIG. 2, described is the television game image print service system according to one embodiment of the present invention. As shown in FIG. 2, a television game image print service system Sgp further includes the memory cassette Mc, the television game machine Ug, a video printer P. and a print control circuit Cp. Assume that the selected game image data Ssi has already been stored in the flash memory 3 in the memory cassette Mc.

The CPU 5 is connected to the ROM 1, the work RAM 7 and the display circuit 9 to exchange the game program data Sp, the selected game image data Ssi, and the display game image data Scv, respectively. The CPU 5 then executes the game program data Sp read from the ROM 1, and generates the display game image data Scv according to the selected game image data Ssi and a print control signal SCP.

The display circuit 9 is connected to the CPU 5, and when supplied with the display game image data Scv, generates the game video data Sv to be actually printed out on the video printer P. The print control circuit Cp is connected to the CPU 5, and when supplied with the print control signal Scp, generates a video printer control signal Scvp for controlling drive of the video printer P.

The video printer P is connected to the print control circuit Cp and the display circuit 9, and when supplied with the video printer control signal Scvp and the game image video data Sv, respectively therefrom, prints out the image selected by the user.

Figure 3:
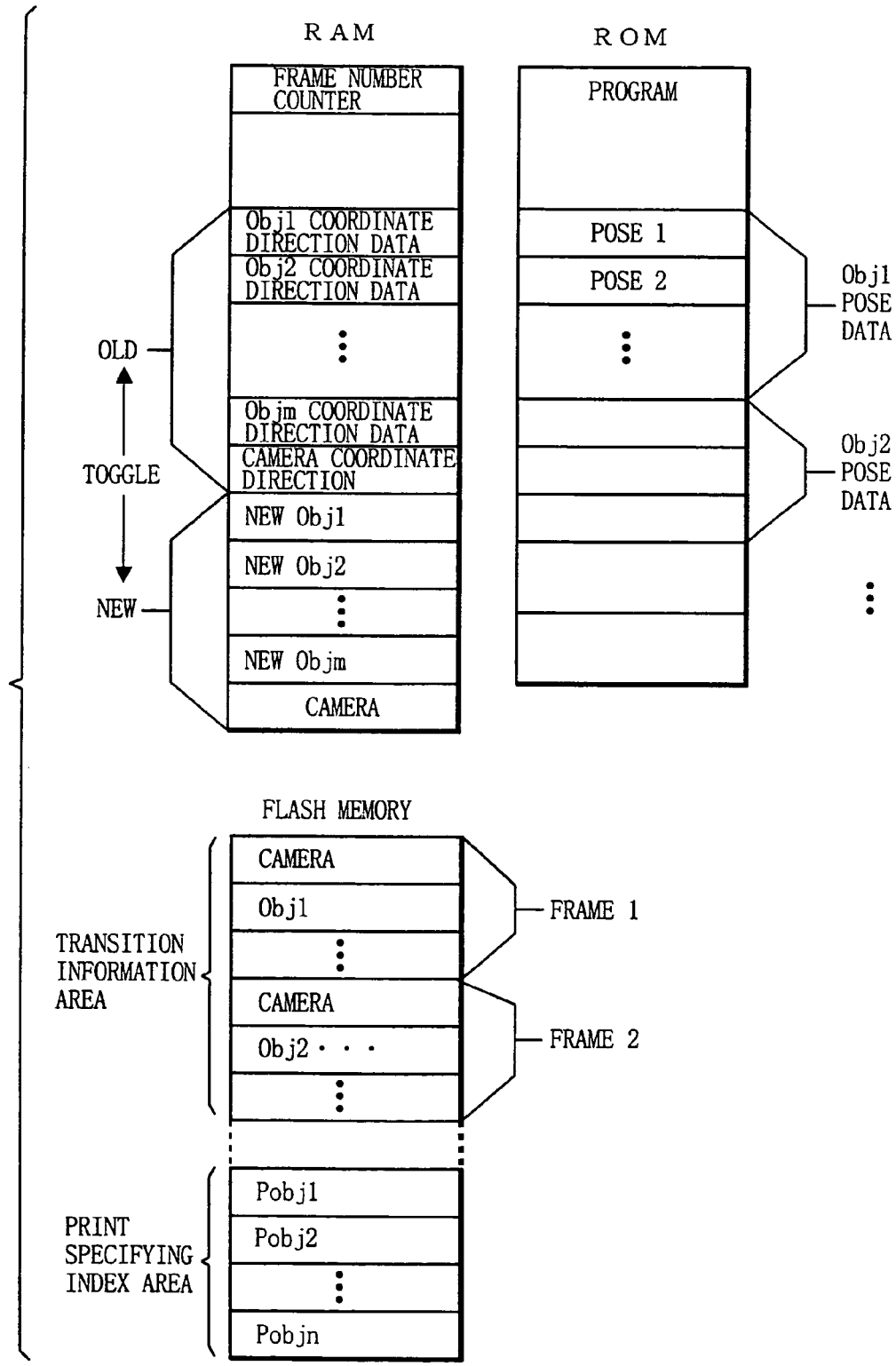
FIG. 3 is a memory mapping diagram in the television game image print service system according to one embodiment of the present invention.

In FIG. 3, there is shown is a memory structure in the ROM 1, the RAM and the flash memory 3 in the present embodiment. As shown in the drawing, the ROM 1 stores a program and various data representing three-dimensional object images. The RAM stores a frame counter, and data indicative of three-dimensional object image data according to the progress of the game. In the present embodiment, the coordinates and direction of each object and the coordinates and direction of a camera are stored as transition information.

Such transition information is alternately renewed as to keep old and new information simultaneously.

In the flash memory 3, the transition information of the selected three-dimensional object images for each frame are sequentially stored in a transition information area therein. Furthermore, recorded in a print specifying index area are print object pointers Pobj1 to Pobjn (n is the number of three-dimensional object images to be printed) indicative of frame numbers in which the transition information of the images to be printed is stored among the selected three-dimensional object images. For example, when 1 is stored in the print object pointer Pobjn, that means, in FIG. 3, the three-dimensional object image of frame 1 is specified as the image to be printed.

In the television game system Sg and television game image print service system Sgp as constructed above, the memory cassette storing the selected game image data Ssi of the game and game data is brought in to a print laboratory for print, thereby allowing the user to obtain a specific image obtained through play as an easily-portable medium such as a photo.

In other words, in such print system in which the selected digital game image data is handed in to a print laboratory for print on a paper medium, by handing in the memory cassette storing the transition information (Ssi) of the game as digital data to the print laboratory, it is possible to extremely reduce or totally eliminate a workload of developing a program for print-out at a game software side and using memory space for such a program. Furthermore, the system is constructed so as to be able to reduce storage space of image data and to provide a more flexible print menu by equipment replacement at a print laboratory's side without altering the game software.

More particularly, in the present system, it is possible to extremely reduce or totally eliminate the workload of developing the game software, thereby allowing reduction in development duration, which is an important factor in game development. Furthermore, since the transition information requires far less memory compared with image data after drawing, the memory cassette can store many images. Further, the print laboratory's side can take any form as long as the print laboratory can change the resolution of drawn image at will when printing according to situations and requirements. The print laboratory may also first output the image only in a limited range of the transition information, and then other image based on the transition information according to demands. For example, the present system has flexibility of easily coping with images even not required at development, by modifying a printout device according to demands after product release.

Figure 4:
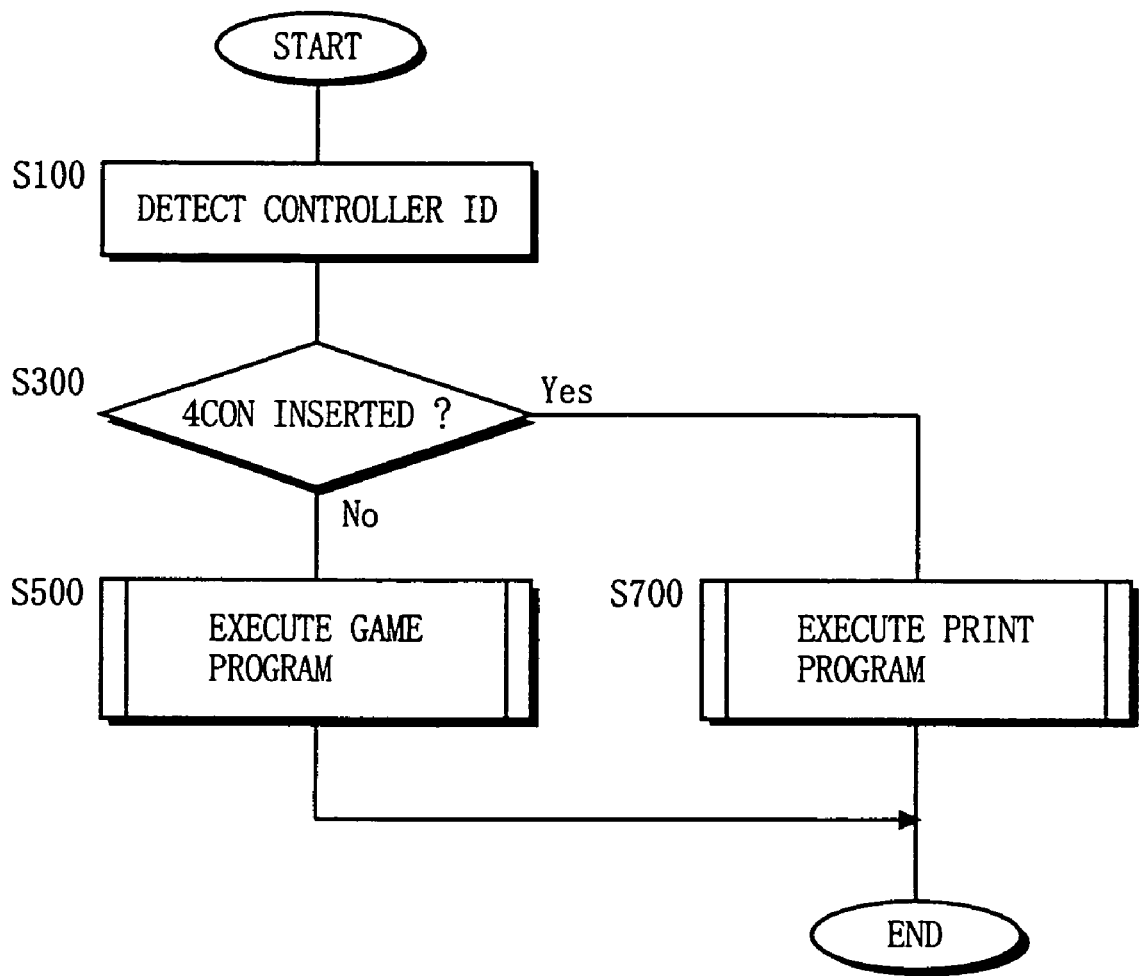
FIG. 4 is a flow chart showing the operation of the television game image print service system according to one embodiment of the present invention.

With reference to FIG. 4, described next is the operation of the three-dimensional image data print system according to the present embodiment. First, in step S100, the ID of a device connected to a controller connector of the television game machine Ug is detected. The procedure then advances to the next step S300.

In step S300, it is determined by the ID detected in step S100 whether the video printer is connected to a controller 4 (4CON) of the television game machine Ug. If the determination result is No, the procedure advances to step S500, where the game program stored in the ROM 1 is executed and then the procedure ends. On the other hand, if the determination result is Yes, the procedure advances to step S700, where the print program stored in the ROM 1 is executed and then the procedure ends. The detailed operation in steps S500 and S700 will be described below with reference to FIGS. 5, 6, and 7.

As described above, in the present system, the image to be printed is generated by using the hardware and game program of the game machine as they are, and therefore it is possible to construct a shop print system as a print laboratory with a simple external apparatus. As a result, system costs can be reduced. Specifically, when the memory cassette Mc accommodates both of the game program Sp and the image information Ssi, the program in the cassette side determines what type of print service is provided without depending on the apparatus at the shop. Therefore, new service can be advantageously provided without replacing the shop apparatus whenever a new game cassette (program) is provided. Also in terms of operability, since connection to the printer triggers switching between game play and print, the operator can easily operate the system without any operation for switching. The program for printout at print laboratories or shops may be included in a program on the CD-ROM instead of the ROM 1 of the memory cassette Mc.

Figure 5:
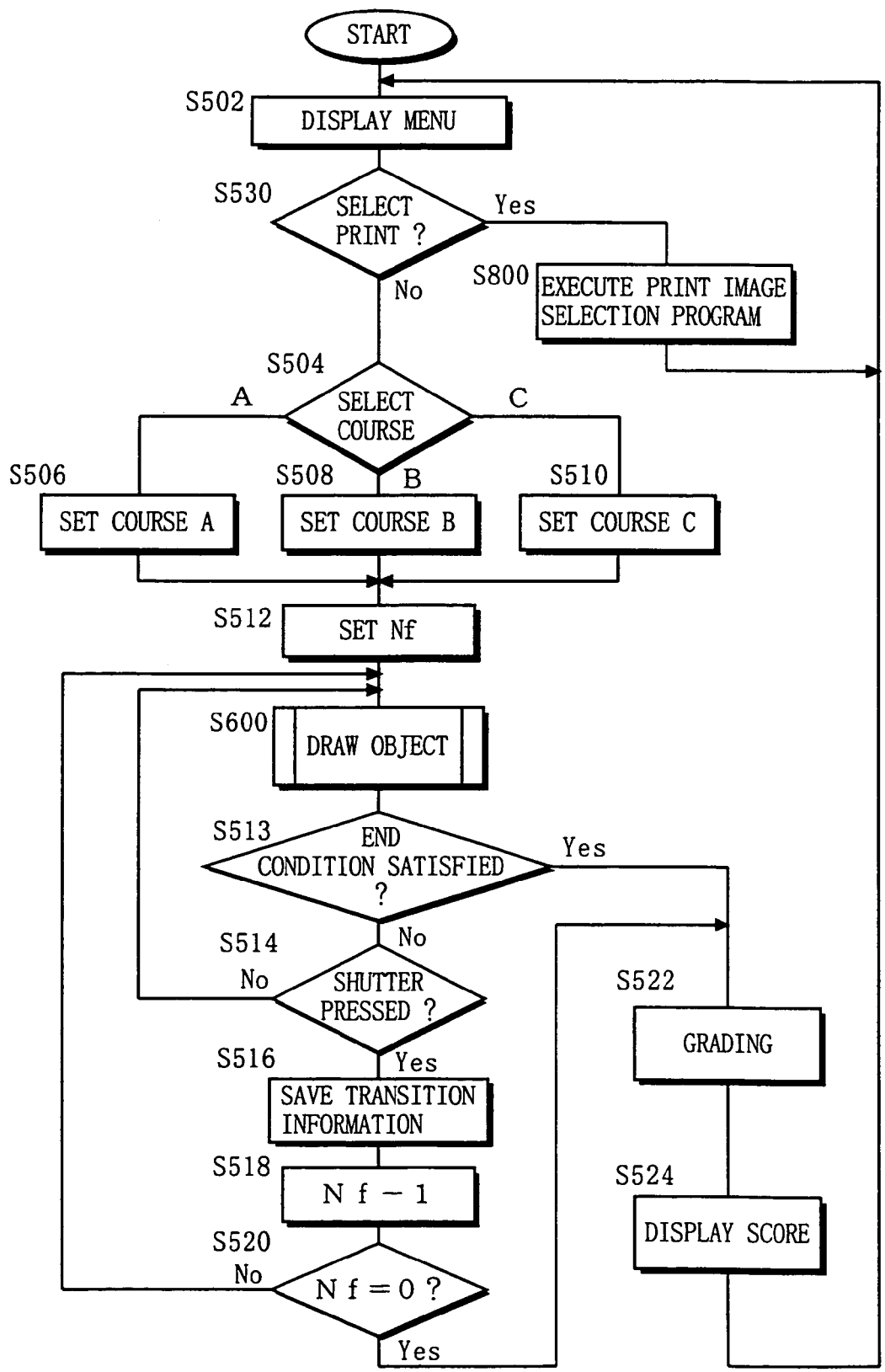
FIG. 5 is a flow chart showing a detailed operation of a game program execution subroutine shown in FIG. 4.

With reference to FIG. 5, described is the processing of a game program execution subroutine in the above step S500. In step S300, when it is determined that the video printer is not connected to the controller 4 (4CON), first, in step S502, a game menu is displayed on the television device D. In the game opening menu, for example, five alternatives "From start", "Continue", "Gallery", and "Option" are presented to the user. When the user wants to play the game from start, the user selects "From start". When the user has played and temporarily stopped the game, the user selects "Continue". Selection of "Gallery" and "Option" will be described below.

When the user selects "Gallery" in the opening menu, "Select print" is selected in step 5530, and a print image selection program execution routine starts in step 5800, which will be described in detail later with reference to FIG. 8.

On the other hand, when the user selects "Continue" in the opening menu, a sub-menu is displayed offering four alternatives, "Go to course", "Pokemon report", "Pokemon album", and "Record", for example. In the present embodiment, the processing when "Go to course" is selected is shown in steps S504 to S524.

In step S504, for example, three courses, Course A, Course B, and Course C are offered for the user as selectable alternatives. In this course selection screen, for example, "Beach", "Tunnel" and others are offered as selectable courses.

When the user selects Course A in step S504, the procedure advances to step S506, where it is set that game data for Course A is read from the ROM 1. Similarly, when Course B is selected, the procedure advances to step S508, where read of game data for Course B is set. When Course C is selected, the procedure advances to step S510, where read of game data for Course C is set.

After read of each course data is set in steps S506, S508, and S510, the procedure advances to step S512.

In step S512, the maximum user-selectable number of game images Npmax is set. The procedure then advances to step S600.

In step S600, a game image, that is, an object including Pocket Monsters and backgrounds, is drawn for one frame according to the selected course data. The procedure then advances to step S513. The object drawing subroutine S600 by this step will be described later in detail referring to FIG. 6.

In step S513, it is determined whether—end conditions of going around the course are satisfied. If No, the procedure advances to step S514.

In step 5514, it is determined whether an object is selected by the user. To select an object, the user uses the controller C, imitating operation of aiming at the object displayed on the television device D and pressing the shutter on a camera. If No is determined instep S514, the procedure returns to the object drawing subroutine in step S500, wherein another object image for one frame is drawn.

On the other hand, in step S514, if Yes, that is, if it is determined that the user has selected part of the object image of the present frame, the procedure advances to step S516.

In step S516, the transition information indicating which part of the present frame and under which conditions the user has selected (pressed the shutter) is stored in the flash memory 3 as the selected game image data Ssi. The procedure then advances to step S518. As will be described in detail below, data used as the transition information can be data indicative of the relation between the operation of the controller and the progress of the game by the time the user presses the shutter. Furthermore, the transition information may be coordinates of an image that can be picked up by an avatar that represents the user holding a camera and pressing the shutter.

In step S518, the number of exposures that can be taken Nf is decremented by 1, and the procedure then advances to the next step S520.

In step S520, it is determined whether the number of exposures Nf is 0 or not. If No, that is, if the number of exposures Nf is not 0 and the user can still take pictures, the procedure returns to the object drawing subroutine in step S600, where an object for the next one frame is further drawn.

When it is determined in step S513 that the end conditions have been satisfied, and when it is determined in step S520 that the number of exposures Nf is 0 and the user can no longer take pictures, the procedure advances to step S522.

In step S522, each object image taken (selected) by the user pressing the shutter is graded based on references such as the size and pose of a character and picture-taking techniques. Other arbitrary references can be added to these references for grading, such as rareness of the character. After such grading, the procedure advances to step S524.

In step S524, scores obtained by grading in the above step S522 are displayed. The procedure then returns to step S502.

Figure 6:
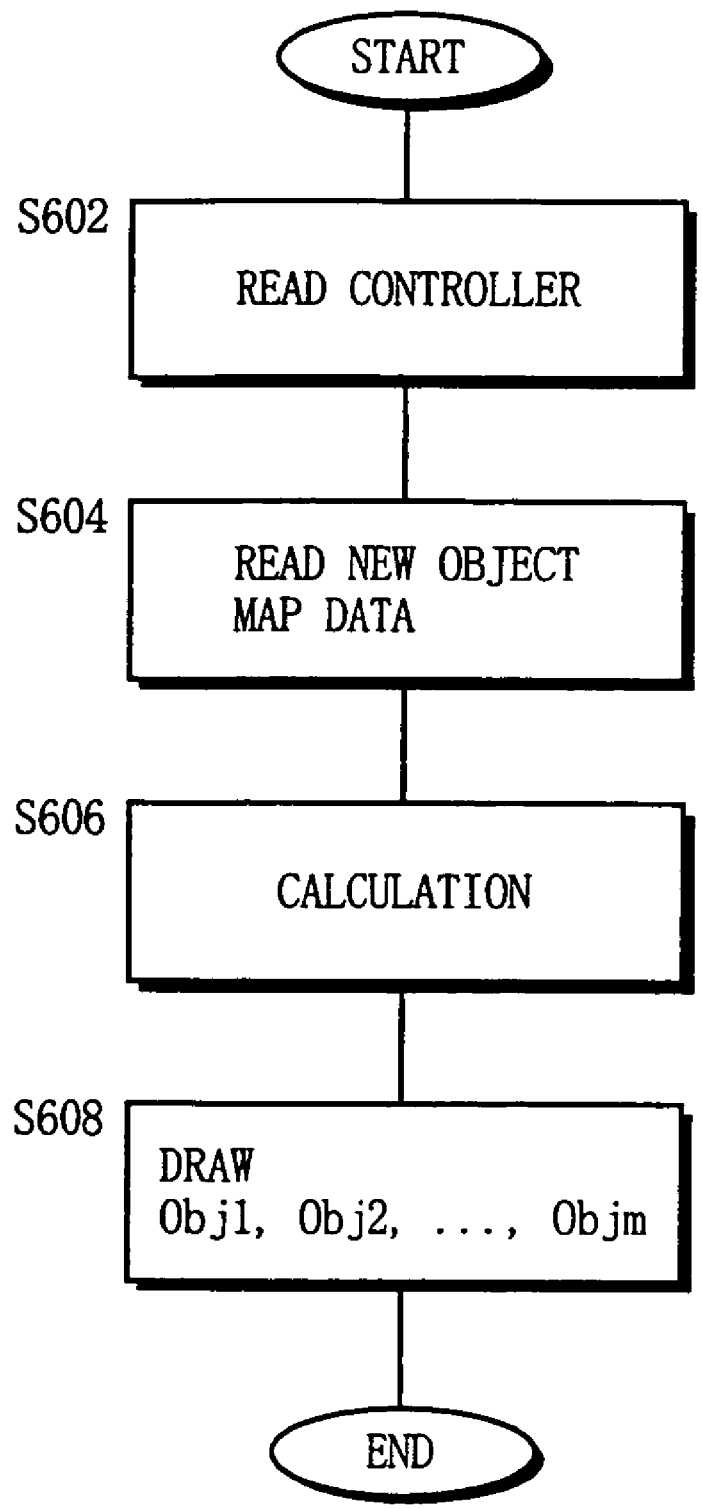
FIG. 6 is a flow chart showing a detailed operation of an object drawing subroutine shown in FIG. 5.

Next, with reference to FIG. 6, described in detail is the object drawing subroutine in step S600 shown in FIG. 5. If No in step S530, that is, if the number of exposures Nf is set in S512, if it is determined that the shutter has not been pressed in step S514, or if the number of exposures Nf is not 0 in step S520, in step S602, the operational state of the controller C is read. The procedure then advances to the next step S604.

In step S604, based on the state of the controller C read in step S602, new object map data representing the objects that can be observed from the user's avatar is read. The procedure then advances to the next step S606.

In step S606, based on the new object map data read in step S604, objects Obj1, Obj2, ..., Objm of the image for one frame that can be observed from the user's avatar are calculated. The procedure then advances to the next step S608.

In step S608, the calculated objects Obj1, Obj2, ..., Objm are drawn on the television device D. The procedure then ends.

Figure 8:
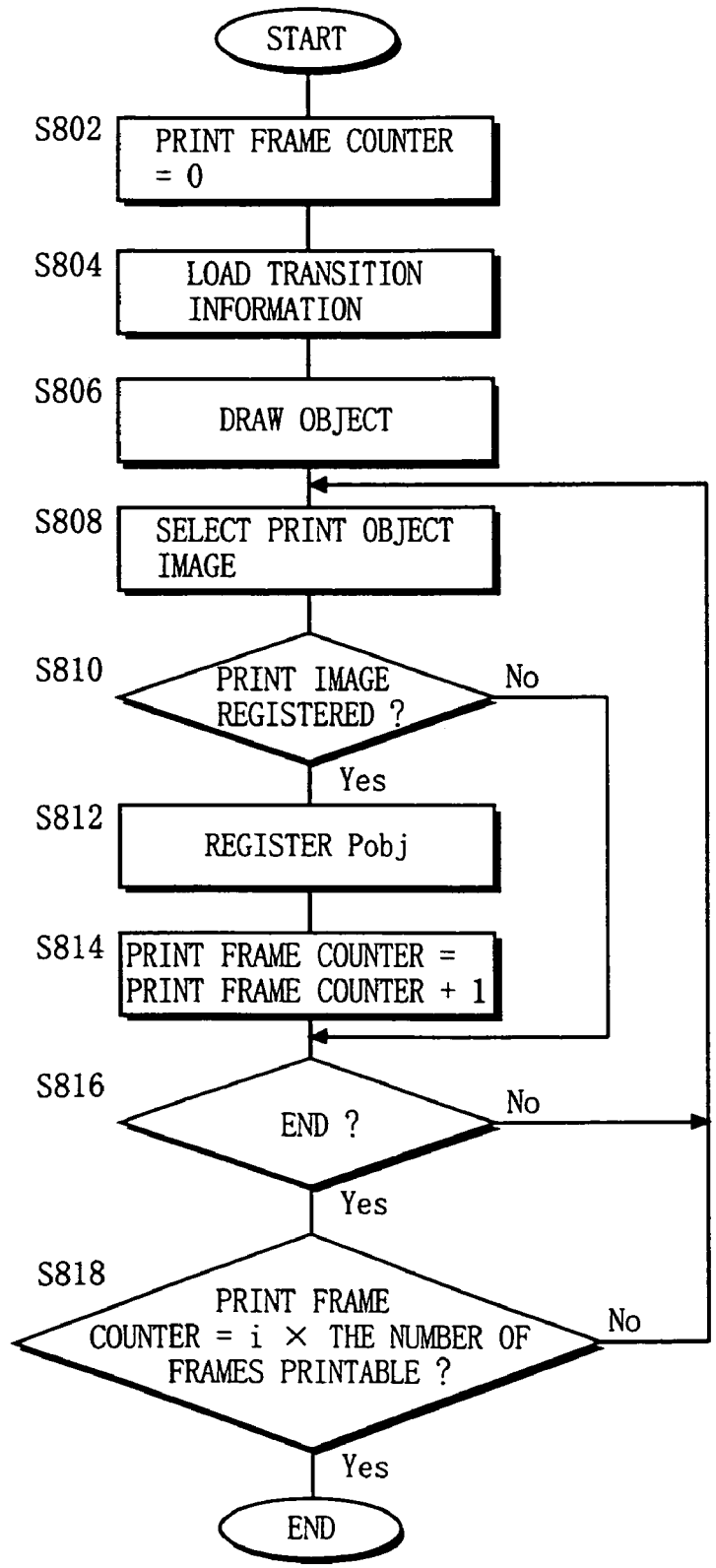
FIG. 8 is a flow chart showing a detailed operation of a print image selection program execution subroutine shown in FIG. 5.

Next, with reference to FIG. 8, the print image selection subroutine in step S800 shown in FIG. 5 is described.

First, in step S802, a print frame counter indicating the number of prints of the image desired by the user is reset to 0.

In step S804, the whole transition information of the selected three-dimensional objects is read from the flash memory 3.

In step S806, based on the read transition information, the selected three-dimensional object images are all drawn and displayed at a glance.

In step S808, the user selects a specific image from among the displayed three-dimensional object images using a pointer such as a direction switch, a joystick, or a mouse. Then, to print out the selected three-dimensional object image, the user operates input means located on the pointer to register the three-dimensional object as an image for print.

In step S810, it is determined whether the user registers the displayed image for print. If Yes, that is, if the image is registered, the procedure advances to step S812.

In step S812, frame numbers (FIG. 3) of the flash memory 3 with the transition information of the registered three-dimensional object image stored therein are stored in the print object pointer Pobjn in sequence.

In step S814, the print frame counter, which has been reset to 0 in step S802, is incremented by 1, and then the procedure advances to step S816.

On the other hand, if No is determined in step S810, the procedure advances to step S816.

In step S816, it is determined whether there is an image to be printed among the displayed three-dimensional object images. Further, when there is an image to be printed among the displayed three-dimensional object images, No is determined, and the procedure returns to step S808 and repeats processing in the above steps S810, S812, and S814 until Yes is determined in step S816. Then, the frame numbers (FIG. 3) of the flash memory 3 storing the transition information of the three-dimensional object image to be printed are stored in the print object pointers Pobji, Pobj 2, ... in sequence, and the print frame counter is incremented by 1 such as 1, 2, ... in sequence.

Then, in step S816, if Yes, that is, if the three-dimensional object images to be printed have been all registered, the procedure advances to step S818.

In step S818, it is determined whether the value of the print frame counter is i times (i is a positive integer) the number of printable frames for each printing sheet. When i is 1, the value 6f the print frame counter equals to the number of printable frames for each printing sheet. That is, the three-dimensional object images registered in the above described step S808 are printed on all frames on one printing sheet, meaning that there is no blank frame on the printing sheet after printing. Therefore, if Yes is determined in this step, the registered three-dimensional objects can be printed over i printing papers without any wasted frame, and therefore the procedure ends.

However, if No is determined in step S818, there is a frame without print. Therefore, the procedure returns to step S808 and repeats steps S810 to S816, and when the value of the print frame counter becomes i times the number of printable frames (S818), the procedure ends.

Furthermore, in step S814, the print frame counter may be incremented by an arbitrary positive integer C not less than 2, instead of by 1. In this case, the same three-dimensional object image can be printed out C times.

Figure 7:
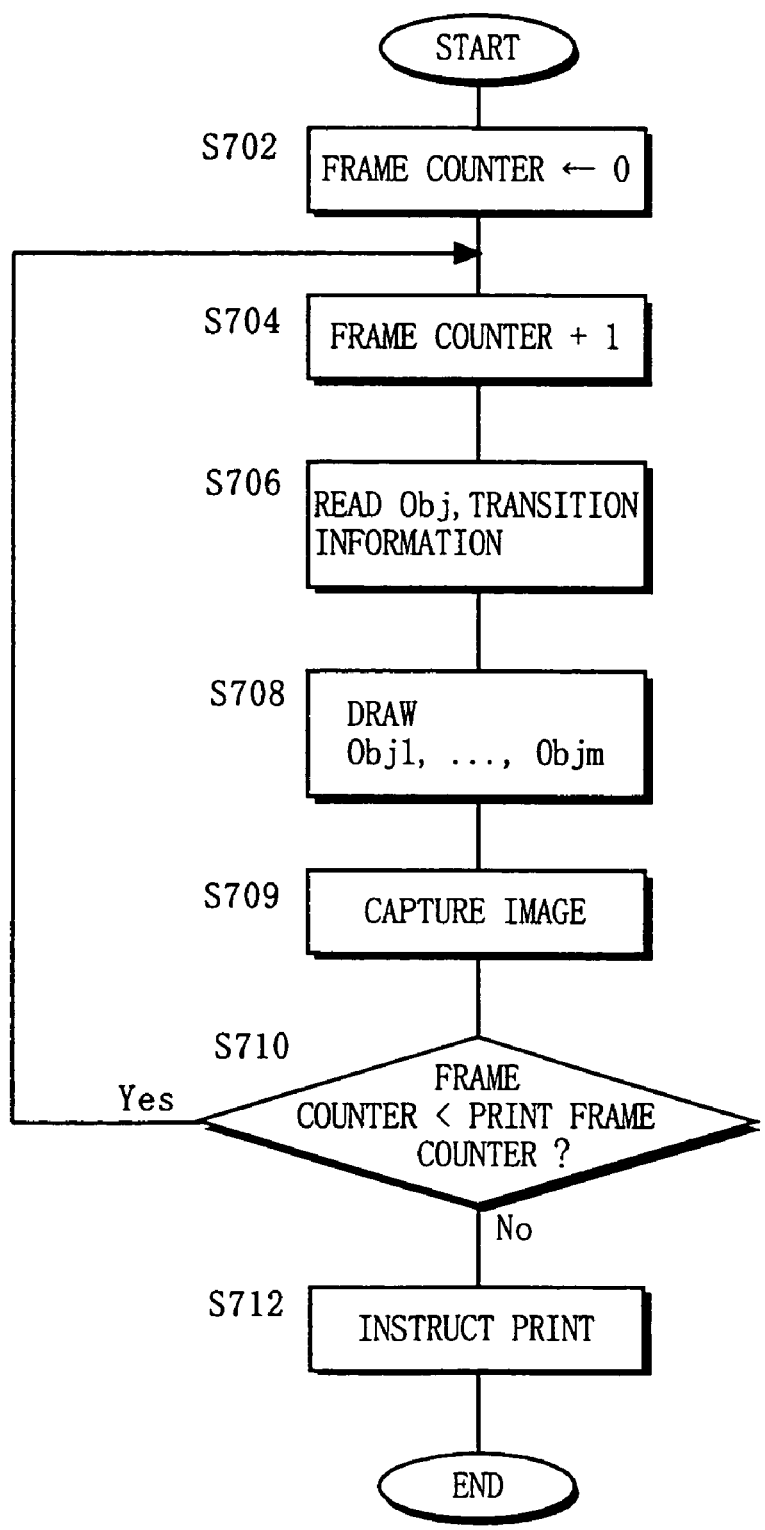
FIG. 7 is a flow chart showing a detailed operation of a print program execution subroutine shown in FIG. 4.

Next, with reference to FIG. 7, described is the print program execution subroutine in step S700 shown in FIG. 4. When it is determined that "4CON is inserted" in step S300 shown in FIG. 4, in step S702, the frame counter for counting the number of images to be printed is reset to 0. The procedure then advances to step S704.

In step S704, the frame counter is incremented by 1. Since the frame counter is reset to 0 in step S702, the value of the frame counter indicates 1 immediately after execution of the print program.

In step S706, the transition information of the three-dimensional object image to be printed is read from a transition information storage part of the flash memory 3 based on the print object pointer Pobji in the print specifying index area of the flash memory 3.

In step S708, based on the read transition information, the three-dimensional object images Obji, . . . , Objm are drawn.

In step S709, the images drawn in step S708 are captured by the video printer.

In step S710, it is determined whether the value of the frame counter is smaller than that of the print frame counter. If Yes, that is, if any registered three-dimensional object image to be printed has not yet been read from the transition information area of the flash memory 3, the procedure returns to step S704. The procedure then repeats steps S704 to S708 until No is determined in step S710, causing the three-dimensional object images of the print object pointers Pobj2, Pobj3, . . . , to be sequentially read.

On the other hand, if No, that is, if all three-dimensional object images registered to be printed in the print image selection program execution routine in step S800 have been read, the procedure advances to step S712.

Then, in step S712, print instruction is outputted, thereby printing the selected object images on the printing sheet without any wasted frame.

As described above, after it is determined that "4CON is inserted" in step S300 shown in FIG. 4, a new step S701 may be provided before step S702 in the print program execution subroutine in step S700. That is, in step S701, the print image selection program is executed in the above step S800. When no image to be printed is registered, the user is notified by display that no image to be printed is registered, and prompted to register any image to be printed. In addition to such display, the print image selection program in step S800 may be executed. In any case, when images to be printed on a printing sheet are not appropriately registered, printing process is not started, thereby preventing printing with any blank frame on the printing sheet.

As described above, in the system where images are printed on a 16-split or 9-split sticker and can be selected individually, it is effective that the user cannot exit the present mode until the images are filled in all frames without any blank frame. That is, in a system where image data is handed in through a digital media to a laboratory that specifies each image individually or a group of plural frames and creates 16-split-sticker print, in order to prevent a minor from erroneously leaving a frame blank and getting frustrated, the system does not allow the minor to exit the selection mode until no blank frame is present when selecting the image.

As described above, in the present specification, three-dimensional object image data is exemplarily described as the subject to be processed in the present invention. However, the subject includes two-dimensional image data. When two-dimensional image data is to be processed, the transition information is information with which an image can be specified, such as two-dimensional coordinates defining a predetermined range on a two-dimensional plane, or progress information of the game.

In the present invention, as the two-dimensional or three dimension image data, the user can have a character of the user's avatar go around the virtual world constructed in the game to take pictures of the virtual world itself including characters living therein, and output the taken images of the virtual world as real photos. The user can take pictures of the virtual world by having the character of the user's avatar go around the virtual world in the game, to select virtual characters living therein and take pictures of the virtual characters in various pauses in response to instructions.

Described in detail in the present specification is an example that an arbitrary image in the virtual world is selected, photographed, and outputted as a real photograph. In other words, the example described herein is a game in which a hero, which is an avatar of the user, rides a vehicle and photographing monsters while moving in a three-dimensional space.

However, the present invention does not depend on the types of game, and is further applicable to applications for printing out images of the virtual world as photographs without the user's selection of a subject to be photographed. Such games includes RPGs (role playing games), shooting games, simulation games, and action games.

Described briefly below is the case in which the present invention is applied to an RPG. The RPG is a game in which the user is a hero, adventuring on various towns or caves. In such game, the hero goes to unknown towns or caves one after another, thereby making the game proceed. For recording the town or cave the hero visited, transition information is written in a predetermined area of rewritable memory (RAM, a magnetic disk, a DVD, and flash memory, for example). In this case, the transition information corresponds to, for example, a flag set in the memory area corresponding to a predetermined town or cave.

If the print service system side is provided with a function for printing out images of scenery at the place the hero visited with correspondence to the flag in the memory area, it is possible to print out an image of specific part of the virtual world, a scenery collection of entrances of the caves the hero has visited, for example, without requiring the user to perform a kind of image selection operation of selecting or photographing the image. Furthermore, the print image of the scenery collection is provided for the print system side. Therefore, service can be planned or developed to be provided even after release of the game.

In view of the above, it is clear that the transition information is not limited only to the information indicating transition states of a three-dimensional object image representing arbitrary part of a three-dimensional object image, but means the entire or part of information to be recorded according to the progress of the game.

While the invention has been described in detail, the foregoing description is in all aspects illustrative and not restrictive. It is understood that numerous other modifications and variations can be devised without departing from the scope of the invention.

The invention claimed is:

1. A television game apparatus for displaying a game image of a virtual world, comprising:
   game image generating programmed logic circuitry for generating the game image by executing a game image generation program according to a game progression as dictated by a user playing the game;
   selection programmed logic circuitry for selecting an arbitrary part of said generated game image, according to instructions from said user;
   transition information generating programmed logic circuitry for generating transition information when said game image is selected; and
   at least one transition information storage location for storing said transition information, wherein
   the game image arbitrarily selected by said user is recoverable at a future time according to the transition information stored in said at least one transition information storage location and said game image generation program.

2. The television game apparatus as claimed in claim 1, wherein
said game image generation program is stored in ROM, and said at least one transition information storage location is included in a rewritable non-volatile memory.

3. The television game apparatus as claimed in claim 2, wherein
said ROM and said rewritable non-volatile memory are accommodated in a device which is removable from a body of the television game apparatus.

4. The television game apparatus as claimed in claim 2, wherein
said ROM and said rewritable non-volatile memory are separately removable from a body of the television game apparatus.

5. The television game apparatus as claimed in claim 1, further comprising:
recovery programmed logic circuitry for recovering the game image arbitrarily selected by said user using the transition information stored in said at least one transition information storage location as an operational parameter.

6. The television game apparatus as claimed in claim 1, wherein
said game image generating programmed logic circuitry generates the game image according to progress of a game which varies in response to instructions from the user.

7. The television game apparatus as claimed in claim 1, wherein
said game image is a two-dimensional image.

8. The television game apparatus as claimed in claim 7, wherein
said transition information includes coordinates and direction of an object and coordinates and direction of a viewpoint.

9. The object image display apparatus as claimed in claim 7, wherein
said transition information is game progress information in a game.

10. The television game apparatus as claimed in claim 1, wherein
said game image is a three-dimensional image.

11. A computer-readable recording medium with an executable computer program recorded thereon to control a game image generator for generating a game of a virtual world image in a television game,
said computer program causing said game image generator to execute the steps of:
generating a game image by executing a game image generation program according to a game progression as dictated by a user playing the game;
selecting an arbitrary part of said generated game image, according to instructions from said user; and
generating transition information of a game image representing the arbitrary part of said selected game image, wherein
the game image arbitrarily selected by said user can be recovered at a future time according to the transition information stored in said transition information storage and said game image generation program.

12. The computer-readable recording medium as claimed in claim 11, wherein
said computer program further causes said game image generator to execute the steps of:
recovering the game image arbitrarily selected using the transition information as an operational parameter; and
printing out said recovered game image.

13. The computer-readable recording medium as claimed in claim 12, wherein
said game image generator generates the game image according to progress of a game which varies in response to instructions from the user, based on said computer program.

14. A television game apparatus for displaying a game image of a virtual world, comprising:
game image generating programmed logic circuitry for generating the game image by executing a game image generation program according to a game progression as dictated by a user playing the game;
selection programmed logic circuitry for selecting an arbitrary part of said generated game image according to instructions from the user;
transition information generating programmed logic circuitry for generating transition information when said game image is selected; and
at least one transition information storage location for storing said transition information, wherein
the game image arbitrarily selected by said user is recoverable after said game image generation program ends, according to the transition information stored in said at least one transition information storage location and said game image generation programmed logic circuitry.

* * * * *